(12) United States Patent
Post

(10) Patent No.: US 8,726,126 B2
(45) Date of Patent: May 13, 2014

(54) NON-REGULAR PARITY DISTRIBUTION DETECTION VIA METADATA TAG

(75) Inventor: Daniel J. Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 707 days.

(21) Appl. No.: 12/729,564

(22) Filed: Mar. 23, 2010

(65) Prior Publication Data

US 2011/0239088 A1 Sep. 29, 2011

(51) Int. Cl.
*G06F 11/10* (2006.01)

(52) U.S. Cl.
USPC .......................................................... 714/763

(58) Field of Classification Search
USPC ........... 714/763, 805, 746, E11.032, E11.034
See application file for complete search history.

(56) References Cited

U.S. PATENT DOCUMENTS

| | | | |
|---|---|---|---|
| 6,529,997 | B1 | 3/2003 | Debiez et al. |
| 7,139,863 | B1 | 11/2006 | Defouw et al. |
| 7,366,825 | B2 | 4/2008 | Williams et al. |
| 7,389,397 | B2 | 6/2008 | Paley et al. |
| 2005/0091569 | A1* | 4/2005 | Chao .............................. 714/758 |
| 2006/0064539 | A1 | 3/2006 | Mukaida et al. |
| 2007/0022241 | A1 | 1/2007 | Sinclair |
| 2007/0083697 | A1 | 4/2007 | Birrell et al. |
| 2007/0268905 | A1 | 11/2007 | Baker et al. |
| 2008/0010580 | A1 | 1/2008 | Anderson et al. |
| 2008/0098157 | A1 | 4/2008 | Andrewartha et al. |
| 2008/0126848 | A1 | 5/2008 | Yoshida |
| 2008/0270730 | A1 | 10/2008 | Lasser et al. |
| 2008/0288712 | A1 | 11/2008 | Cornwell et al. |
| 2009/0100115 | A1 | 4/2009 | Park et al. |
| 2009/0157950 | A1* | 6/2009 | Selinger ......................... 711/103 |
| 2009/0158085 | A1* | 6/2009 | Kern et al. ......................... 714/6 |
| 2009/0172262 | A1* | 7/2009 | Olbrich et al. ................. 711/103 |
| 2009/0172335 | A1* | 7/2009 | Kulkarni et al. ............... 711/170 |
| 2009/0172466 | A1* | 7/2009 | Royer et al. ....................... 714/6 |
| 2010/0106753 | A1* | 4/2010 | Prabhakaran et al. ......... 707/818 |

(Continued)

FOREIGN PATENT DOCUMENTS

| | | |
|---|---|---|
| EP | 0242595 | 10/1987 |
| JP | S62-257558 | 11/1987 |

(Continued)

OTHER PUBLICATIONS

U.S. Appl. No. 12/729,544, filed Mar. 23, 2010.
U.S. Appl. No. 12/729,556, filed Mar. 23, 2010.
Apte et al. "Adding Parity to the Linux ext3 File System." ACM SIGOPS Operating Systems Review, vol. 41, Issue 1, Jan. 2007, pp. 56-65.

(Continued)

*Primary Examiner* — Ajay Bhatia
*Assistant Examiner* — Thien D Nguyen
(74) *Attorney, Agent, or Firm* — Van Court & Aldridge LLP

(57) ABSTRACT

This can relate to non-regular parity distribution of a non-volatile memory ("NVM"), such as flash memory, and detection of the non-regular parity via a metadata tag. For example, each codeword of the NVM can include one or more parity pages that may be distributed at random through the NVM. To identify the page as a parity page, a parity page marker can be included in the metadata of that page. During power-up of the NVM, an address table including the logical-to-physical address mapping of the pages can be created. Pages including a parity page marker, however, can be skipped during the creation of this address table. Additionally, by having two or more parity pages associated with a codeword, an additional layer of protection can be provided for repairing errors in that codeword.

27 Claims, 9 Drawing Sheets

(56) References Cited

U.S. PATENT DOCUMENTS

| | | | |
|---|---|---|---|
| 2010/0131697 A1* | 5/2010 | Alrod et al. | 711/103 |
| 2010/0281341 A1* | 11/2010 | Wu et al. | 714/763 |
| 2011/0022780 A1 | 1/2011 | Wakrat et al. | |
| 2011/0055454 A1* | 3/2011 | Byom et al. | 711/103 |
| 2011/0072189 A1 | 3/2011 | Post et al. | |
| 2011/0107013 A1* | 5/2011 | Ho | 711/103 |
| 2011/0185112 A1* | 7/2011 | Goss | 711/103 |
| 2011/0231713 A1* | 9/2011 | Takada et al. | 714/54 |
| 2011/0271039 A1* | 11/2011 | Baek et al. | 711/103 |
| 2012/0005559 A1* | 1/2012 | Jeong et al. | 714/773 |

FOREIGN PATENT DOCUMENTS

| | | |
|---|---|---|
| JP | 2004-152196 | 5/2004 |
| JP | 2005-056397 | 3/2005 |
| WO | 2005/043378 | 5/2005 |
| WO | 2008/136562 | 11/2008 |

* cited by examiner

NON-REGULAR PARITY DISTRIBUTION DETECTION VIA METADATA TAG

FIELD OF THE INVENTION

This can relate to non-regular parity distribution of a non-volatile memory, such as flash memory, and detection of the non-regular parity via a metadata tag.

BACKGROUND OF THE DISCLOSURE

NAND flash memory, as well as other types of non-volatile memories ("NVMs"), is commonly used for mass storage. For example, consumer electronics such as portable media players or cellular telephones often include raw flash memory or a flash card to store music, videos, and other media.

Some non-volatile memories, such as NAND flash memory, may have memory locations that include initial defects or can develop defects through use. Also, data stored in usable memory locations may suffer from other error-causing phenomena, such as read disturb or charge retention issues. Thus, to ensure that data stored in these memory locations can be accurately retrieved, "parity data" can be computed and stored along with the data. For example, an error correcting code may be applied to the data to generate such parity data.

Moreover, today's consumer electronics can often include an embedded system that controls the operations of the device and performs access requests to the NVM (e.g., read, write, or erase commands). When power is initially applied to the electronic device, the electronic device may scan through the NVM to determine the contents of the NVM (e.g., of each page of the NVM). For example, during the scan, the electronic device can identify the logical address associated with each page.

SUMMARY OF THE DISCLOSURE

Systems and methods are disclosed for non-regular parity distribution in a non-volatile memory ("NVM"), such as flash memory (e.g., NAND flash memory). Furthermore, systems and methods for detection of such non-regular parity distributions via a metadata tag are disclosed herein.

In some embodiments, an electronic device can be provided that may include a system-on-a-chip and a NVM. The NVM may include flash memory, such as NAND flash memory, or any other suitable type of non-volatile memory. The system-on-a-chip can include a NVM interface for accessing the NVM. In some embodiments, the NVM interface may receive write requests from a file system to store user data in the NVM, retrieve requests to retrieve (e.g., read, or otherwise access) data stored in the NVM, or both.

In some embodiments, the data can be stored in two or more contiguous pages (e.g., physical addresses) of the NVM that together constitute a "codeword." Each page of the codeword can include ECC data for correcting errors of that page (e.g., "inner ECC"). Moreover, one or more "parity pages" can be included in the codeword, where each parity page can provide ECC data related to the codeword as a whole (e.g., "outer ECC"). Each parity page can provide an additional layer of protection for correcting errors of the codeword. For example, when a codeword includes "m" parity pages, errors in that codeword may be suitably corrected even when the codeword includes up to "m" uncorrectable pages (e.g., where an "uncorrectable page" can refer to a page whose inner ECC data may not be sufficient to correct the errors of that page).

In some embodiments, the parity pages can have a non-regular distribution across the NVM. As an illustration, a "regular distribution" of parity pages may include parity pages that are always located in the same die number of a super block of an NVM. In contrast, a NVM with a non-regular distribution of parity pages may include parity pages that are not necessarily located in the same die number, and which can rather be located in any suitable location of the NVM. Similarly, rather than being confined to starting and ending in the same location (e.g., same die number of a super block), codewords can include a non-regular distribution of starting and ending positions and a non-regulation distribution of length.

In this manner, the non-regular distribution of parity pages can help provide a greater amount of protection for certain data. As an illustration, a greater number of parity pages can be used to protect more important information, and a fewer number of parity pages can be used to protect less important information. As another illustration, in some embodiments a greater number of parity pages can be used to protect pages that are more susceptible to errors, and a fewer number of parity pages can be used to protect pages that are less susceptible to errors.

As the parity pages of an NVM memory can have a non-regular distribution, it may not be immediately known which pages (e.g., physical addresses) of the NVM are parity pages. To determine which page are parity pages, a "parity page marker" can be included in, for example, the metadata information of each page. This metadata tag can be read by an NVM interface or other suitable component of the electronic device to determine whether or not a particular page is a parity page.

In some embodiments, during power-up of an electronic device, a table mapping the logical-to-physical address of the pages of the NVM can be generated. This table can be generated by, for example, scanning through the pages and reading their logical addresses upon power-up, and then storing these logical addresses and the associated physical address of the read page in the logical-to-physical address table. As it may be unnecessary to include outer ECC data in such a table, however, the parity page marker of each page can be read during this scanning. When the parity page marker indicates a page is a parity page, that page can be skipped and its information not included in the logical-to-physical address table.

In some embodiments, the non-regular distribution of parity pages can influence the retrieval of data from a NVM. For example, while retrieving a codeword from the NVM, an uncorrectable page can be encountered. However, due to the non-regular distribution of parity pages, it may not immediately be known how many parity pages are associated with the codeword, and thus it may not be immediately known whether the uncorrectable page can be repaired. Accordingly, in some embodiments the data of a codeword can be buffered while that codeword is retrieved. Upon reaching the end of the codeword, the NVM interface (e.g., or other suitable component) can determine how many parity pages are included in the codeword and, therefore, whether or not the uncorrectable pages of that codeword (if any) can be repaired. If the uncorrectable pages can be repaired, the buffered data and parity pages may be used to repair the uncorrectable pages.

In some embodiments, the NVM interface may only begin buffering a codeword upon encountering a first uncorrectable page in a codeword. In this scenario, if an uncorrectable page is encountered, the NVM interface can "scan left" across the codeword to buffer all previous pages as well as the current page of the codeword. The NVM interface may then continue retrieving the codeword and buffering the rest of the codeword as the remainder of the codeword is retrieved. Upon reaching the end of the codeword, the number of parity pages can be determined and, if there are a suitable number of parity pages, the uncorrectable pages can be repaired.

In some embodiments, rather than buffering the data, the necessary calculations for repairing uncorrectable codewords can be calculated "on the fly." For example, the NVM interface can "assume" there are two parity pages (e.g., or any other suitable number of parity pages) associated with the codeword being retrieved. As the codeword is being retrieved, the NVM interface can update two calculations with the data of the retrieved pages, where each calculation can be associated with a different one of the assumed parity pages. Upon reaching the end of the codeword, the actual number of parity pages and the number of uncorrectable pages can be determined. In the event that the second calculations is not necessary (e.g., there is only one or less uncorrectable pages, or there is only one actual parity page), then the second calculation can be discarded. When both calculations are necessary (e.g., there are two actual parity pages and there are two uncorrectable pages), then the two calculations can be used to repair the uncorrectable pages.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
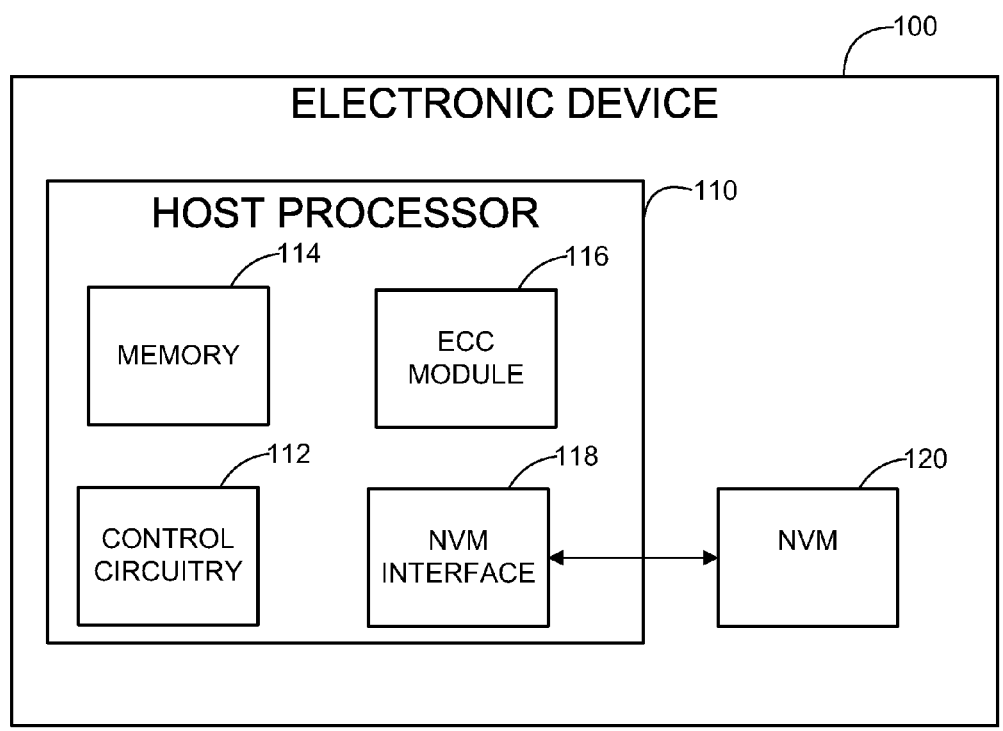
FIGS. 1 and 2 are schematic views of electronic devices configured in accordance with some embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance (PDA), a desktop computer, a laptop computer, a portable gaming device, a remote controller, and any other suitable type of electronic device.

Electronic device 100 can include system-on-a-chip ("SoC") 110 and non-volatile memory ("NVM") 120. SoC 110 can include control circuitry 112, memory 114, error correction code ("ECC") module 116, and NVM interface 118. While NVM interface 118, ECC module 116, and control circuitry 112 are shown as separate modules included in a system-on-a-chip, this is intended only to simplify the description of the embodiments of the invention. For example, in some embodiments, these modules may all be separate physical entities and/or formed as their own microelectronic chip. As another example, in some embodiments, these modules may all be formed in a single microelectronic chip and may share the same substrate and/or hardware. As yet another example, in some embodiments these modules may share some portions of hardware, software components, or both. Accordingly, integrated portions of control circuitry 112 and NVM interface 118 may sometimes be referred to collectively as "control circuitry."

Non-volatile memory 120 may be used to store information that can be retained when electronic device 100 is powered down. As used herein, and depending on context, a "non-volatile memory" can refer to NVM integrated circuits in which data can be stored, or may refer to a NVM package that includes such NVM integrated circuits (e.g., NVM 120).

Non-volatile memory 120 can include a NAND flash memory based on floating gate or charge trapping technology, NOR flash memory, EPROM, EEPROM, Ferroelectric RAM ("FRAM"), magnetoresistive RAM ("MRAM"), any other known or future types of non-volatile memory technology, or any combination thereof. In some embodiments, NVM 120 can include a removable memory device that is external electronic device 100. In this case, NVM 120 can include, for example, a Universal Serial Bus ("USB") memory drive, a memory card (e.g., a flash card), or any other suitable removable memory device. In some embodiments, NVM 120 can be integrated into electronic device 100. In this case, NVM package 120 can be, for example, an integrated memory of the electronic device.

NVM 120 can include multiple dies (i.e., integrated circuits), where each die can be organized into one or more "blocks," and where each block may be erasable at once. Each block may be further organized into "pages," where each page may be programmable and readable at once. For example, each page can correspond to a particular "physical address" of the NVM, where data can be written to and/or read from the physical address. The blocks from corresponding dies of NVM 120 (e.g., one block from each die that has the same position or "block number" in the die) may form logical storage units referred to as "super blocks." Moreover, the dies of NVM 120 may include any suitable number of blocks and pages. In addition to the page, each memory location (e.g., block and the like) of NVM 120 can be addressed using a physical address (e.g., physical block address).

FIG. 1, as well as later figures and various disclosed embodiments, may sometimes be described in terms of using flash technology. However, this is not intended to be limiting, and any other type of non-volatile memory can be implemented instead. Moreover, electronic device 100 can include any other suitable components, such as a power supply or any user input or output components, which have not been depicted in FIG. 1 in order to prevent overcomplicating the figure.

As mentioned above, system-on-a-chip 110 can include control circuitry 112, memory 114, error correction code ("ECC") module 116, and NVM interface 150. Control circuitry 112 can control the general operations and functions of SoC 110 and the other components of SoC 112 and/or electronic device 100. For example, responsive to user inputs and/or the instructions of an application, control circuitry 112 can issue read or write commands to NVM interface 118 to obtain data from or store data in NVM 120. For clarity, data that control circuitry 112 requests for storage or retrieval may be referred to as "user data," even though the data may not be directly associated with a user or user application. Rather, the user data can include any suitable sequence of digital information generated or obtained by control circuitry 112 (e.g., via an application).

Control circuitry 112 can include any combination of hardware, software, and firmware, and any components, circuitry, or logic operative to drive the functionality of electronic device 100. For example, control circuitry 112 can include one or more processors that operate under the control of software/firmware stored in NVM 120 and/or memory 114.

Memory 114 can include any suitable type of volatile or non-volatile memory, such as dynamic random access memory (DRAM), synchronous dynamic random access memory (SDRAM), double-data-rate (DDR) RAM, cache memory, read-only memory (ROM), any other suitable memory, or any combination thereof. Memory 140 can include a data source that can temporarily store user data for programming into or reading from non-volatile memory 120. In some embodiments, memory 140 may act as the main memory for any processors implemented as part of control circuitry 112.

ECC module 116 can employ one or more error correcting or error detecting codes, such as a Reed-Solomon ("RS") code, a Bose, Chaudhuri and Hocquenghem ("BCH") code, a cyclic redundancy check ("CRC") code, or any other suitable error correcting or detecting code to generate ECC data. As used herein, the term "ECC data" can refer to any suitable data generated by applying an error correcting and/or detecting code on user data, where the ECC data can be used for verifying the user data, correcting the user data, or both.

In some embodiments, an ECC module can apply an error correcting code to the user data of a single page to generate "inner ECC data." The inner ECC data can then be used for correcting and/or verifying the user data of that single page. Moreover, as will be described in greater detail below, in some embodiments an ECC module can apply an error correcting code to the user data of an entire codeword (e.g., two or more contiguous pages). In this case, the ECC module can generate "outer ECC data" that can be used for correcting the user data of the codeword as a whole. The outer ECC data can be stored in one or more "parity pages," where a parity page can be a page devoted to storing this outer ECC data. Parity pages and outer ECC data will be described in greater detail below.

ECC module 116 may have a certain "strength," where the "strength" of the ECC may indicate the maximum number of errors (e.g., flipped bits) that may be corrected by an inner ECC generated by ECC module 116. For example, ECC module 116 may employ an error correcting code able to correct up to "t" errors in a page and that can detect up to "n" errors in a page (where n can be a greater number of errors than t). As used herein, the term "t errors" refers to the maximum number of errors an ECC code can correct in a page, and "n errors" refers to the maximum number of errors an ECC code can detect in a page. For example, if a page contains more than t errors, that page may be "uncorrectable" by the inner ECC data. Similarly, if the page contains more than n errors, the inner ECC data may be unable to suitably determine how many errors are present in that page.

ECC module 116 can be implemented in hardware such as, for example, one or more linear feedback shift registers (LFSRs), or may be implemented in software that is executed by a processor. For software implementations, corresponding program code may be stored in, for example, NVM 120 or memory 114.

NVM interface 118 may include any suitable combination of hardware and software configured to act as an interface or driver between control circuitry 112 and NVM 120. For any software modules included in NVM interface 118, corresponding program code may be stored in NVM 120 or memory 114.

NVM interface 118 can perform a variety of functions that allow control circuitry 112 to access NVM 120 and to manage the memory locations (e.g., pages, blocks, super blocks, dies, and the like) of NVM 120 and the data stored therein (e.g., user data). For example, NVM interface 118 can interpret the read or write commands from control circuitry 112, direct ECC module 116 to encode user data that will be stored in NVM 120, direct ECC module 116 to decode user data that is read from NVM 120, perform garbage collection, perform wear leveling, generate read and program instructions compatible with the bus protocol of NVM 120, and the like.

Figure 2:
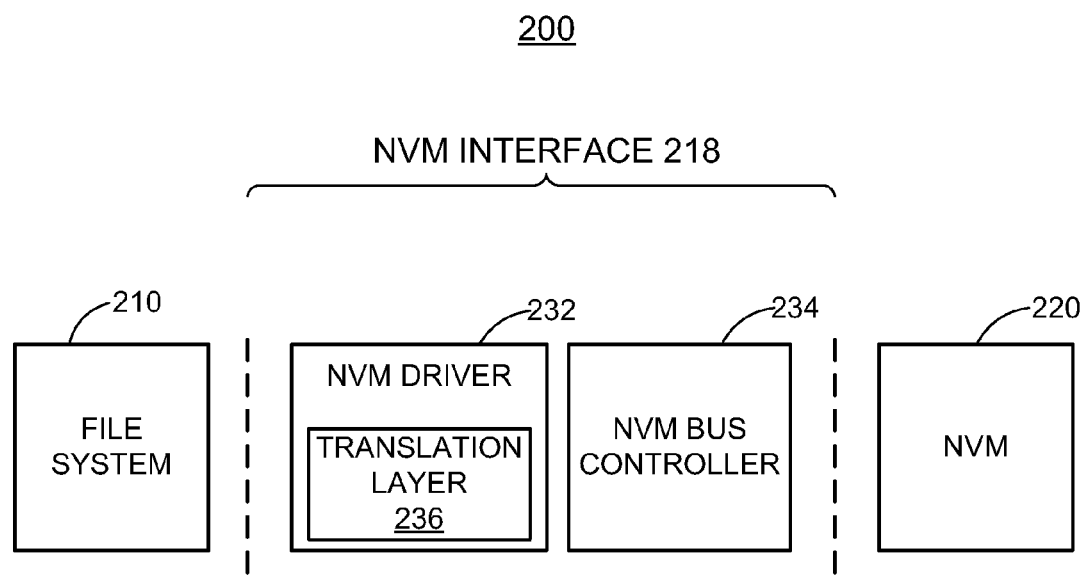

FIG. 2 is a schematic view of electronic device 200, which may illustrate in detail some of the software and hardware components of electronic device 100 (FIG. 1) in accordance with various embodiments. Electronic device 200 may therefore have any of the features and functionalities described above in connection with FIG. 1, and vice versa. Electronic device 200 can include file system 210, NVM interface 218, and NVM 220. NVM interface 218 may, for example, correspond to NVM interface 118 of FIG. 1, and can include NVM driver 232 and NVM bus controller 234. File system 210 and NVM driver 232 may be software modules, and NVM bus controller 234 and NVM 220 may be hardware modules. Accordingly, NVM driver 232 may represent the software aspect of NVM interface 218, and NVM bus controller 234 may represent the hardware aspect of NVM interface 218.

File system 210 can include any suitable type of file system, such as a File Allocation Table ("FAT") file system, and may be part of the operating system of electronic device 200 (e.g., part of SoC control circuitry 112 of FIG. 1). In some embodiments, file system 210 may include a flash file system, such as Yet Another Flash File System ("YAFFS"). In these embodiments, file system 210 may perform some or all of the functionalities of NVM driver 232 discussed below, and therefore file system 210 and NVM driver 232 may or may not be separate modules.

File system 210 may manage file and folder structures for the application and operating system. File system 210 may operate under the control of an application or operating system running on electronic device 200, and may provide read and write commands to NVM driver 232 when the application or operating system requests that information be read from or stored in NVM 220, respectively. Along with each read or write command, file system 210 can provide a logical address to indicate where the user data should be read from or written to, such as a logical page address or a logical block address with a page offset.

File system 210 may provide read and write requests to NVM driver 232 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives do not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 232 can include translation layer 236. In some embodiments, translation layer 236 may be a flash translation layer ("FTL"). On a write operation, translation layer 236 can map the logical address to a free, erased physical address on NVM 220. On a read operation, translation layer 236 can use the logical address to determine the physical address at which the requested data is stored. Since each NVM may have a different layout depending on the size or vendor of the NVM, this mapping operation may be memory and/or vendor specific. Translation layer 236 can perform any other suitable functions in addition to logical-to-physical address mapping. For example, translation layer 236 can perform any of the other functions that are typical of flash translation layers, such as garbage collection and wear leveling.

NVM driver 232 may interface with NVM bus controller 234 to complete NVM access requests (e.g., write, read, erase requests, etc.). For example, NVM driver 232 may provide NVM bus controller 234 with the physical address at which to store or retrieve data, and, for write requests, the corresponding data vector to be written. NVM bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata." The metadata may be generated by NVM driver 232 or may be generated by a module operating under the control of NVM driver 232. Metadata can include, for example, any information used for managing the mapping between logical and physical addresses (e.g., a "logical address" provided by file system 210), bad block management information, wear leveling information, garbage collection information, error correcting code ("ECC") data, or any combination thereof. Thus, in general, as used herein the term "metadata" may refer to any information about or relating to user data (e.g., and that is not user data) that can be used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical addresses, ECC data for the user data, and any other suitable metadata at one memory location of NVM 220. As another example, metadata can be stored at any suitable memory location of NVM 220.

Figure 3:
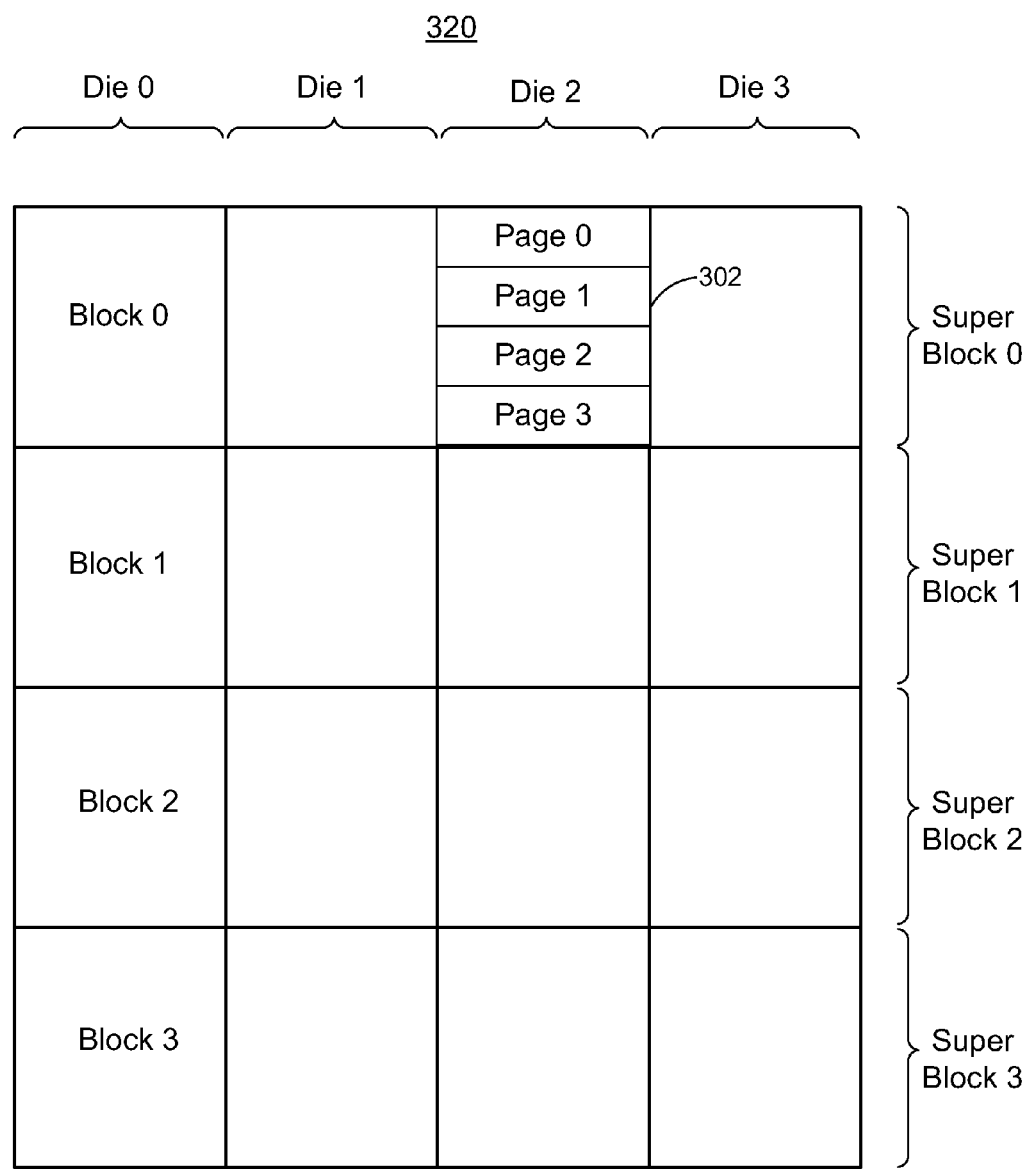
FIGS. 3 and 4 are functional views of a non-volatile memory in accordance with some embodiments of the invention.
Figure 4:
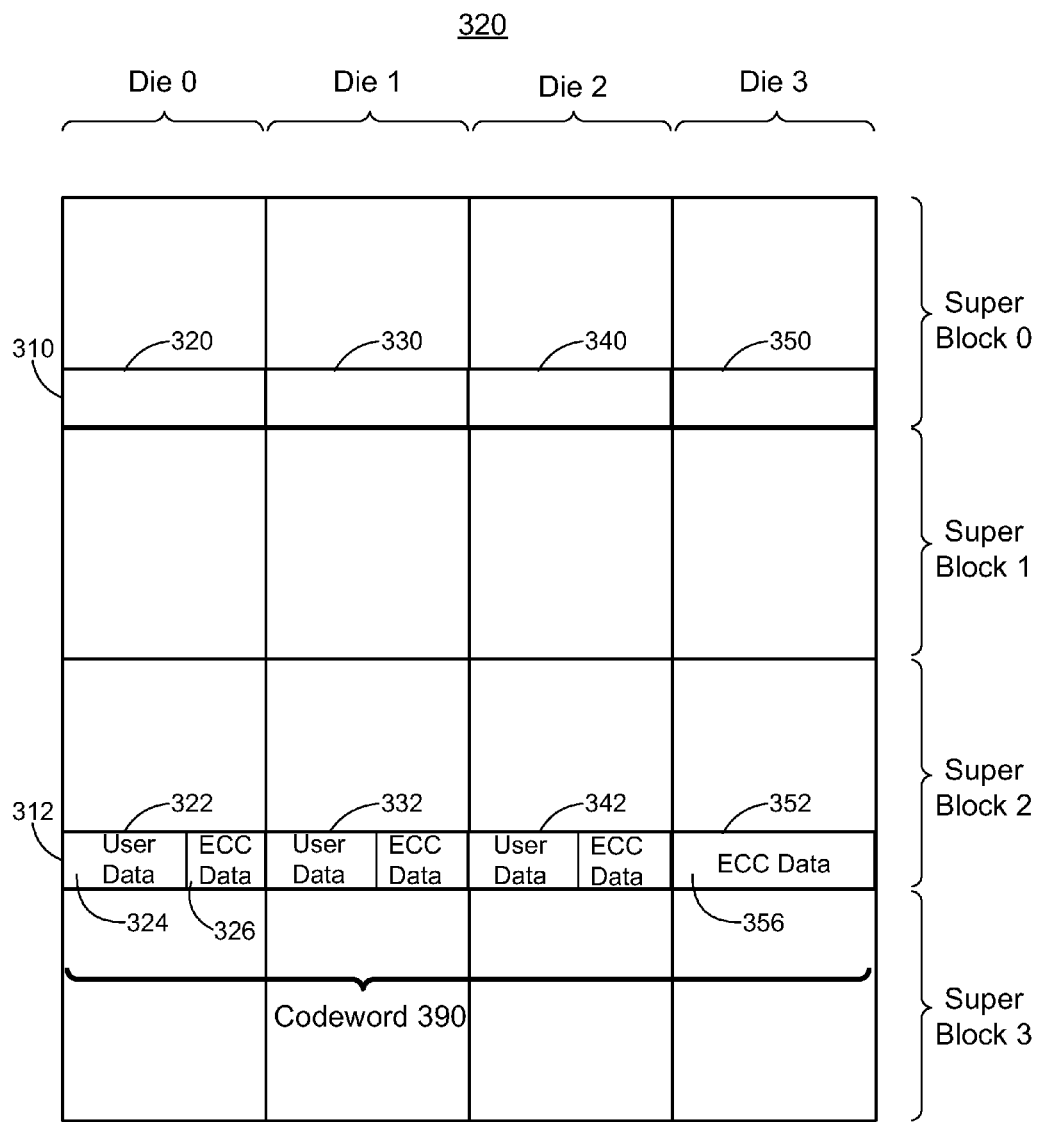

As mentioned above, a non-volatile memory (e.g., NVM 120 of FIG. 1), can be organized into dies, blocks, pages, super blocks, and the like. For example, FIGS. 3 and 4 show schematic layouts of NVM 320. FIGS. 3 and 4 are merely meant to illustrate the organizational layout of NVM 320 and do not indicate an actual, physical layout of the non-volatile memory. For example, although die 0 is illustrated as being next to die 1 in FIGS. 3 and 4, this is merely for illustrating the functional relationship of these dies, and in the actual, physical layout of NVM 320, these dies may or may not be located near one another. Moreover, although a certain number of dies, blocks, and pages are shown in FIGS. 3 and 4, this is merely for the purpose of illustration and one skilled in the art could appreciate that NVM 320 could include any suitable number of dies, blocks, and pages. As one illustration, each die of NVM 320 can include 4096 blocks, each block may include 64, 128, or 192 pages based on whether the block is an SLC block, 2-bit MLC block, or 3-bit MLC block, and each page can include 512 bytes.

As illustrated by FIG. 3, NVM 320 can include one or more dies (i.e., integrated circuits), such as die 0, die 1, die 2, and die 3. Each die may then be organized into one or more "blocks." For example, die 0 is illustrated as being organized into blocks 0-3. During an erase command of NVM 320, an entire block of memory may be erased at once. Each block of the dies may then be organized into one or more pages. For example, block 0 of die 2 (e.g., block 302), is illustrated as being organized into pages 0-3. During a read or write command of NVM 320, a full page may be read or written at once, respectively. NVM 320 can also include one or more super blocks that include one block from each die that has the same position or "block number" in the die. For example, super block 0 of NVM 320 can include block 0 of each of dies 0-3. Similarly, super block 1 of NVM 320 can include block 1 of each of dies 0-3, super block 2 of NVM 320 can include block 2 of each of dies 0-3, and so forth.

Each super block of NVM 320 can include one or more "stripes" that are formed by including one page from each die of the super block, where each page has the same page number in that die. For example, FIG. 4 shows stripe 310 of NVM 320. Stripe 310 can include the same page number of each of dies 1-3 of super block 0. During operation of NVM 320, the pages of a stripe and/or super block may be sequentially processed. For example, during a read or write operation of stripe 310, page 320 may be processed, followed by the processing of page 330, then followed by the processing of page 340, and then followed by the processing of page 350. In this manner, the data included in stripe 312 can be considered a "codeword" of information. In particular, as used herein, the term "codeword" can refer to data included in one or more contiguous pages of a non-volatile memory that together form a piece of information. As will be described in greater detail below, the codeword is not limited to a single stripe and can include data from contiguous pages of one or more stripes.

Each page of NVM 320 can include any suitable information. For example, the pages can include user data, metadata or both. In some embodiments, metadata such as ECC data can be included in the pages to provide for error detection and/or correction of the information stored in NVM 320. For example, an ECC module (e.g., ECC module 116 of FIG. 1) can apply an error correcting code to the user data of a single page to generate "inner ECC data." The inner ECC data can then be used for correcting and/or verifying the user data of that single page. As an illustration of this, FIG. 4 shows stripe 312 can include pages 322, 332, 342, and 352. Together, the data in pages 322, 332, 342, and 352 can form codeword 390. Page 322, for example, can include a first portion of user data 324 and a second portion of inner ECC data 326. Although not illustrated for simplicity, page 322 can also include any other suitable data or metadata (e.g., location data, generation data, and the like) for the management or operation of NVM 320. As described above, ECC data 326 can be generated by having a suitable ECC module run an error correcting code on the user data of page 322 to generate this ECC data.

During retrieval of page 322 (e.g., reading the stored data or otherwise accessing the data), the inner ECC data of page 322 can be used for maintaining the integrity of the user data of page 322. For example, if there are "t" errors or less in the user data of page 322, the inner ECC data of that page can be used to correct these errors. Similarly, if the are n errors or less in the user data of page 322, the inner ECC data of that page can identify how many errors are present in page 322 (e.g., where n can be greater than t). Similarly, pages such as page 332 and 342 can include user data and their associated inner ECC data.

In some embodiments, ECC data can additionally be provided for the user data of one or more pages. For example, an ECC module (e.g., ECC module 116 of FIG. 1) can apply an error correcting code to the user data of an entire codeword to generate "outer ECC data." This outer ECC data can be used for correcting the user data of the codeword as a whole. As an illustration of this, FIG. 4 shows page 352 of stripe 312 that can include outer ECC data 356 that can be associated with the user data of pages 322, 332, and 342. In other words, outer ECC data 356 of page 352 can be used for correcting and/or detecting errors in the entirety of codeword 390. To generate the outer ECC data 356, as described above a suitable error correcting could have been run on the entirety of codeword 390.

As page 352 can include outer ECC data for the entirety of codeword 390 (e.g., rather than inner ECC data for just a single page), page 352 can be referred to as "parity page" 352. As used herein, the term "parity page" refers to a page of an NVM that can include outer ECC data for correcting and/or detecting errors in the user data of two or more pages of data. In some embodiments, the parity page can be devoted to outer ECC data and may not include any user data of its own. Moreover, although outer ECC data 356 is illustrated in FIG. 4 and filling the entirety of parity page 352 (e.g., as using all bytes of information in parity page 352), outer ECC data 356 may alternatively fill only a portion of page 352. In particular, outer ECC data may only use as much space of a parity page as is necessary for holding that outer ECC data. For example, if the outer ECC data for codeword 390 includes 400 bytes of information and parity page 352 can store 512 bytes, then this outer ECC data may occupy only 400 of the 512 bytes of parity page 352.

In this manner, that data in each page of codeword 390 can be protected twice. First, each page is protected by the inner ECC data of that page (e.g., user data 324 can be protected by inner ECC data 326). As an illustration, when user data 324 has t errors or less, inner ECC data 326 can be used to correct these errors. A second layer of protection can then provided for user data 322 through outer ECC data 356 of parity page 352. For example, if user data 322 has more than t errors, inner ECC data 326 of page 322 alone may be insufficient to correct user data 322. In this case, outer ECC data 356 of parity page 352 can be used to correct user data 322. For example, an equation can be generated that involves the user data of the pages of the codeword and the outer ECC data of the parity page. For simplicity, a simple addition equation is given below as an example:

$$X = A + B + C \quad (1)$$

where X can be related to the outer ECC data of parity page 352, A can be related to the user data of page 322, B can be related to the user data of page 332, and C can be related to the user data of page 342. Equation (1) is provided as an addition equation to simplify the illustration, however any other suitable equation involving X, A, B, and C could alternatively be used. Assuming B and C both include less than t errors, the user data of B and C can be correctly known. If A has more than t errors, A can be an "uncorrectable" page whose inner ECC data is insufficient for correcting A. In this case, the correct user data for A can be determined by solving Equation (1) for A:

$$A = X - B - E \quad (2)$$

In this manner, outer ECC data 356 of parity page 352 can be used to determine the correct user data of a page, and can provide a second level of protection for the user data of NVM 320. Moreover, this can allow the user data of a page to be corrected even when that page contains more than t errors (e.g., even when that page is "uncorrectable").

In some embodiments, NVM 320 can include user data that is, for example, more important or more prone to errors than other data in the non-volatile memory. In such cases, it may be desirable to provide additional protection for such data. For example, when one parity page is provided for a codeword, if one page or less has more than t errors, the user data in that page may still be corrected. However, if the codeword includes 2 or more pages with more than t errors, then the single outer ECC data alone may be unable to correct both of these page (e.g., since a single equation such as equation (1) may not be solved for 2 unknowns). Thus, in some embodiments, two or more sets of ECC data (e.g., two or more parity pages) can be provided for a codeword to provide additional protection for the user data of that codeword. For example, an ECC module can run two error correcting codes on the user data of an entire codeword, where each error correcting code can generate a single set of ECC data. The two sets of ECC data may then be stored in two parity pages of the codeword.

Figure 5:
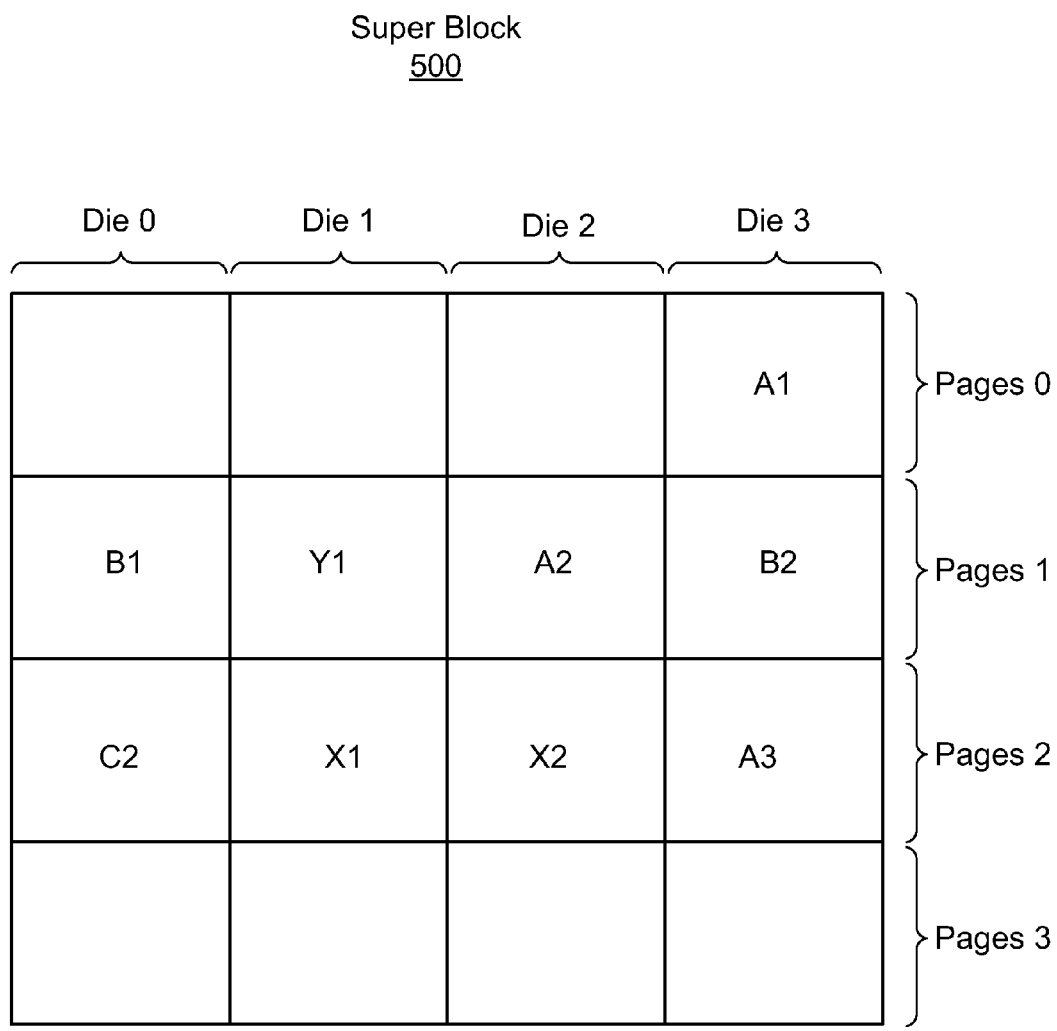
FIG. 5 is a functional view of a super block illustrating non-regular parity distribution in accordance with some embodiments of the invention.

In some embodiments, rather than being confined to a single stripe, a codeword may span two or more stripes of a super block. For example, FIG. 5 shows super block 500 of a non-volatile memory. For example, super block 500 can correspond to any of super blocks 0-3 of NVM 320 of FIG. 3. Although super block 500 is illustrated in FIG. 5 as including a block from each of four dies (i.e., dies 0-3), and each of these blocks is illustrated as having four pages (i.e., pages 0-4), this is merely for the purpose of illustration. Alternatively, super block 500 could include any suitable number of dies and/or pages.

As shown in FIG. 5, pages A1, B1, and Y1 can form a single codeword ("Codeword 1"), where Y1 can be a parity page for Codeword 1. Similarly, A1, B2, C2, X1, and X2 can form a single codeword ("Codeword 2") where X1 and X2 can each be parity pages for Codeword 2. Although Codewords 1 and 2 are illustrated as having 3 and 4 pages, respectively, this is for illustration and Codewords 1 and 2 could alternatively include any suitable number of pages. Accordingly, FIG. 5 illustrates that a codeword can start or end in any suitable location of super block 500 and is not limited to starting and ending at a certain location (e.g., limited to starting at the beginning of a stripe or ending at the end of a stripe). In this manner, the parity pages of the non-volatile memory can have a non-regular distribution within the super block.

FIG. 5 also illustrates that a single codeword can include two or more parity pages to protect the user data of that codeword. In some embodiments, a greater number of parity pages can be used to protect more important information, and a fewer number of parity pages can be used to protect less important information. As another example, in some embodiments a greater number of parity pages can be used to protect pages that are more susceptible to errors, and a fewer number of parity pages can be used to protect pages that are less susceptible to errors.

Accordingly, since a codeword may have multiple parity pages associated with it, the codeword may be correctable when multiple pages have greater than t errors (e.g., when multiple pages are "uncorrectable"). As an illustration, Codeword 2 of FIG. 5 has two parity pages, X1 and X2. Thus, since two parity pages are available, two suitable equations can be generated that involve the user data of the pages of the codeword and the ECC data of the parity pages. For example, two illustrative equations are given below:

$$X1 = A2 + B2 + C2 \quad (3)$$

$$X2 = A2 * B2 * C2 \quad (4)$$

Equations (3) and (4) are merely given for the purpose of illustration, and any other two equations that are sufficient to support the recover of two uncorrectable pages could be used. For example, in some embodiments the first equation can be a simple XOR equation (e.g., GF(2) addition equation) and the second equation can be a Reed-Solomon equation based on $GF(2^x)$, where x can be equal to 8 or any other suitable number.

Accordingly, if up to two pages of Codeword 2 have more than t errors (e.g., are "uncorrectable") the Equations (3) and (4) can be simultaneously solved to determine the correct user data of these pages (e.g., since two equations can be solved for two unknowns). Thus, by generating an additional set of outer ECC data for the codeword, an additional layer of protection can be provided to guard that codeword from data errors. Similarly, any suitable number of parity pages and outer ECC data set can be included to protect a codeword. For example, "n" sets of outer ECC data can be generated for a codeword, thus allowing the codeword to be corrected when there are n or less pages that are "uncorrectable" (e.g., that have t or more errors).

As used herein, the terms "uncorrectable" or "uncorrectable page" can refer to a page that has more than t errors and may not be corrected by the inner ECC data in that page. However, an uncorrectable page can still be repaired when the codeword including the uncorrectable page has a suitable number of parity pages (e.g., has a suitable number of sets of outer ECC data). Accordingly, as used herein, the term "uncorrectable page" is not meant to imply the page can never be corrected, as such pages may still be reparable through the use of one or more parity pages.

Since the parity pages of FIG. 5 have a non-regular distribution, it may not readily be known where the parity pages of the super block are located (e.g., since a codeword can start and end in any location). Accordingly, in some embodiments a marker can be included in the metadata of the pages to indicate which of the pages are parity pages. For example, a "parity page marker" can be included as a metadata tag in each page. Generally, a single bit can be used as this metadata tag. For example, the bit can be a "1" if the page is a parity page, and "0" if the page is not a parity page, or visa versa. Alternatively, any other suitable number of bits can be used for the parity page marker.

A parity page marker stored in the metadata tag of each page may provide space savings in the memory of the system. For example, if parity page markers are not included, it may be necessary to store a separate table (e.g., stored in NVM 120 or memory 114 of FIG. 1) that keeps track of each page of the non-volatile memory and whether or not that page is a parity page. If each page includes a parity page marker, however, rather than maintaining a separate table, the system can determine whether or not a page is a parity page when that page is retrieved for processing (e.g., read, or otherwise has its data accessed).

To aid pages in being properly identified as a parity page or a non-parity page, the metadata tag including the parity page marker can be redundantly stored. For example, in response to a write request, the NVM interface (e.g., NVM interface 118 of FIG. 1) may store the data and its associated parity page marker in a first memory location (e.g., page), and may store a redundant copy of the parity page marker in a second memory location. This way, even if the first memory location becomes inaccessible, the memory interface can still recover the parity page marker from the backup copy stored in the second memory location. Thus, the system can still accurately determine whether or not the page is a parity page. In addition to a parity page marker, any other suitable metadata can be redundantly stored, as discussed in co-pending, commonly-assigned U.S. patent application Ser. No. 12/562,860, filed Sep. 18, 2009 and entitled "METADATA REDUNDANCY SCHEMES FOR NON-VOLATILE MEMORIES," which is hereby incorporated herein in its entirety.

As each page of the NVM can include a parity page marker, it can be possible to determine the size of any codeword from within that codeword. For example, referring again to FIG. 5, a NVM interface (e.g., or any other suitable component of the electronic device) may be scanning (e.g., reading) the data of super block 500. As an illustration, the NVM interface can currently be scanning page A2 of Codeword 2. To determine the size of Codeword 2, the NVM interface can "scan left" until a parity page is encountered.

As used herein, the term "scan left" refers to scanning the pages of a NVM in a direction that is opposite the current processing direction. For example, in FIG. 5, to "scan left" the pages of super block 500 can be scanned in the order . . . A2, Y1, B1, A1, . . . and so forth. Once again, as FIG. 5 merely shows a functional depiction of the NVM and is not meant to indicate a physical layout of the NVM, the term "scan left" does not indicate a physical layout of the pages and is only meant to indicate an order in which the pages are processed. Furthermore, when scanning left, the scan can wrap-around the pages and proceed from one strip to another. For example, when scanning left the pages may be processed in the order . . . C1, B2, A2, . . . and so forth. Similarly, as used herein, the term "scan right" refers to scanning the pages of a NVM in the direction of the current processing direction. For example, in FIG. 5 to "scan right" the pages of super block 500 can be scanned in the order . . . Y1, A2, B2, C1, X1, . . . and so forth.

Accordingly, to determine the size of a codeword, as an illustration, the NVM interface (e.g., or other suitable component of the electronic device) can scan left from page A2. The NVM interface can keep scanning left until a parity page is encountered (i.e., page Y1). For example, the NVM interface can determine that page is a parity page by reading a parity page marker of the page. Since page Y1 can indicate the end of the previous codeword, the NVM interface can determine that codeword 2 begins at the page to the right of page Y1 (i.e., page A2). To locate the end of codeword 2, the NVM interface can scan right until a parity page is encountered (i.e., page X1). The NVM interface may then proceed scanning right until a non-parity page is encountered (i.e., page A3), thus indicating a new codeword has begun. The NVM interface can then determine from these two scans that codeword 2 has two parity pages (e.g., since two parity pages where encountered in the scan right) and that the size of the codeword is 5 pages in length (e.g., pages A2, B2, C2, X1, and X2).

In some embodiments, in addition to or instead of a parity page marker, pages can include a "first page" marker. For example, a metadata tag can be included in the metadata of a page that indicates this page is the first page in a codeword (e.g., page A2 can include a first page metadata tag). Thus, in this case, to determine the beginning of a codeword an NVM interface can scan left until a first page metadata tag is encountered.

In some embodiments, including a non-regular distribution of parity pages can influence various operations of the electronic device. As an example, the non-regular distribution of parity pages can affect the power-up sequence of the device. As described above, an NVM interface may store a logical-to-physical address mapping of the user data of the NVM. In particular, a separate table (i.e., "address table") can be created to maintain this logical-to-physical address mapping. However, the address table may become outdated (e.g., user data may be moved without updating the table) or may develop errors or become unreadable due to disturb effects from neighboring locations, defects, failed read operations, or due to some other error-causing phenomena. Accordingly, in order to help maintain the integrity of address table, this table can be rebuilt upon power-up of the NVM. For example, upon power-up, each page of the NVM can be scanned and the logical address of each page can be read (e.g. from the page's metadata). The logical address may then be associated with that page's physical address and stored in the address table.

As a parity page may not include user data, however, then generally there may be no need to store a logical address of a parity page in the address table. Accordingly, these pages can be "skipped" when creating the address table during power-up of the electronic device. However, due to the non-regular distribution of the parity pages, the system may not readily know the locations of the parity pages. Accordingly, during power-up, the parity page marker of each page can be read. If the parity marker indicates that the page is a non-parity page, the logical address and associated physical address of that page can be stored in the address table. If the parity page marker indicates the page is a parity page, however, that page can be skipped and its logical address not stored in the address table.

Figure 6:
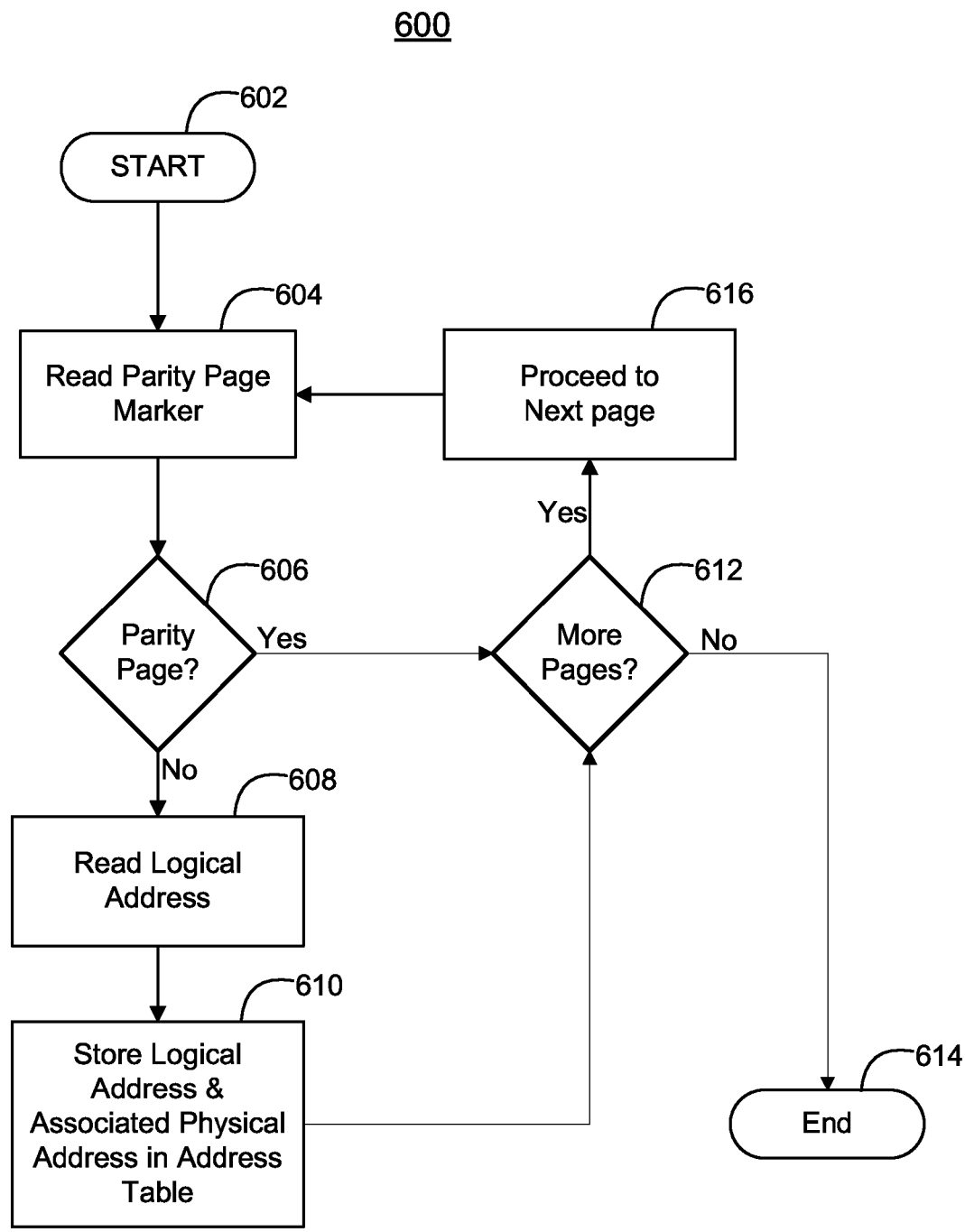
FIG. 6 shows a process for building an address table of a non-volatile memory upon power up in accordance with some embodiments of the invention.

Referring now to FIG. 6, a flowchart of illustrative process 600 is shown in accordance with some embodiments of the invention. Process 600 may be executed to build an address table upon power-up of the electronic device (e.g., electronic device 100 of FIG. 1). In particular, process 600 can be executed to build an address table related to a non-volatile memory having a non-regular distribution of parity pages. Any suitable memory interface, such as NVM interface 118 or 218 of FIGS. 1 and 2, respectively can execute process 600, and process 600 may sometimes be described as such. However, it should be understood that any other suitable component(s) in a memory system or electronic device may be configured to perform these steps.

Process 600 can begin at step 602. For example, step 602 can occur upon power-up of the electronic device. At step 604, process 600 can being scanning the pages of the NVM by reading the parity page marker of the current page. At step 606, this parity page marker can be analyzed to determine whether that page is a parity page or not. For example, a parity page marker of "1" can indicate the page is a parity page, and a parity page marker of "0" can indicate the page is not a parity page. Alternatively, any other suitable marker or bit sequence can be used to indicate whether or not the page is a parity page.

In response to determining the page is not a parity page, process 600 can proceed to step 608 to add this page to the address table. In particular, at step 608, the logical address of the page can be read. At step 608, the read logical address can be associated with the page's physical address and stored in the address table.

At step 612, process 600 can determine whether there are more pages (e.g., physical locations) in the NVM which have not yet been scanned. In response to their being more pages, process 600 can proceed to the next page in the NVM at step 616. Steps 604, 606, 608, 610, 612, and 616 can then be looped and repeated as suitable until the entire NVM has been scanned and the address table has been completed. In response to their being no more pages in the NVM to scan, process 600 can proceed from step 612 to step 614 and then the process may end.

Returning to step 606, in response to the parity page marker indicating the current page is a parity page, process 600 can proceed directly to step 612. In this manner, by bypassing steps 608 and 610, the logical address of the parity page can be skipped and not stored in the address table. Accordingly, by executing process 600, a NVM interface can build an address table including the logical-to-physical addresses of pages including user data (e.g., non-parity pages), while bypassing any pages that only include outer ECC data (e.g., parity pages). In particular, upon determining the page is a parity page, process 300 can ignore that parity page (e.g., ignore the logical address area of the parity page's metadata) and instead keep scanning the page of the NVM until a non-parity page is located.

Another example of a system operation that can be influenced by the non-regular distribution of the parity pages is the retrieval of data from the NVM. For example, retrieval of data can include when a parity page is read, processed, or otherwise has its stored data accessed. When retrieving data, one or more uncorrectable pages (e.g., pages with greater than t errors) can be encountered. In a system with only a single parity page and/or a parity page that is regularly distributed, the system may automatically know how many uncorrectable pages can be repaired in the codeword. However, in a system with a non-regular distribution of parity pages, the system may first need to determine the number of parity pages associated with that codeword before determining whether that codeword can be repaired. For example, if during retrieval of a codeword two uncorrectable pages are encountered, the system may need to determine whether the codeword has two (e.g., or more) set of outer ECC data. If the codeword is associated with two or more sets of outer ECC data, the two uncorrectable pages can be replaced with error-free pages, and the veracity of the codeword can be restored.

As mentioned above, a system can apply equations such as equation (1) (e.g., when a codeword has one set of outer ECC data) or equations (3) and (4) (e.g., when a codeword has 2 sets of outer ECC data), or any other suitable equations to repair uncorrectable pages in a codeword with more than t errors. Thus, in some embodiments, the data of a codeword can be buffered as that codeword is being retrieved. Then, when the entire codeword has been retrieved, the system can determine how many uncorrectable pages are present and how many parity pages are available for that codeword. From this information the system can determine whether the uncorrectable pages can be repaired and, if so, can apply the buffered data to solve the appropriate equations, thereby determining the correct values of the uncorrectable pages.

In some embodiments, rather than buffering a codeword from the start of retrieving a codeword, buffering can begin after an uncorrectable page has been detected. This may, for example, provide memory savings in a system as codewords that do not have any uncorrectable pages may not need to be buffered.

As an illustration, a system can be retrieving codeword 2 of FIG. 5 and may determine that page B2 is uncorrectable. Upon encountering the uncorrectable page, the system can then scan left until the beginning of the codeword (e.g., page A2) is encountered. The system may then buffer the page or pages to the left of page B2 as well as buffering page B2 itself. The system can then proceed retrieving and buffering the pages of the codeword after page B2. In response to encountering additional uncorrectable pages, the system can continue retrieving and buffering the pages of the codeword as there may be a suitable number of parity pages to repair these uncorrectable pages. In other words, the system may not automatically assume a codeword is irreparable upon encountering uncorrectable pages, as there may be a suitable number of sets of outer ECC data at the end of the codeword to repair these pages. Upon encountering the end of the codeword, the system can determine how many parity pages are available (e.g., by reading parity page markers of the pages) and, if there are a suitable number of parity pages, repair the uncorrectable pages (e.g. by applying equations (1), (3), (4), or any other suitable equations related to any suitable number of sets of outer ECC data).

In some embodiments, rather than buffering the codeword, one or more suitable equations for correcting pages can be calculated "on the fly" as that codeword is being retrieved. As an illustration, as a codeword is retrieved, the system can treat the pages as if the codeword is associated with two parity pages (e.g., or any other suitable number of parity pages). Accordingly, as the pages are retrieved, the data of the pages can be used to update calculations of equations such as equation (3) and (4) (e.g., or any other suitable equations) on the fly. Upon reaching the end of the codeword and determining how many parity pages are actually present, the system may, for example, apply both equations, apply only one of the equations, apply no equations, or discard the codeword. For example, upon determining there are two uncorrectable pages and two parity pages, both of the equations can be applied to repair these pages. As another example, upon determining there is one uncorrectable page and one parity page, one of the calculated equations can be used to correct this page (e.g., and the other calculated equation can be discarded). As yet another example, upon determining there are no uncorrectable pages, then none of the calculated equations may be used as no repairs are needed. As yet another example, upon determining there are not enough parity pages to repair the uncorrectable pages, the codeword can be discarded as having inaccurate data. Similarly, an "on the fly" method can be used that calculates three or more equations as the codeword is retrieved.

Figure 7A:
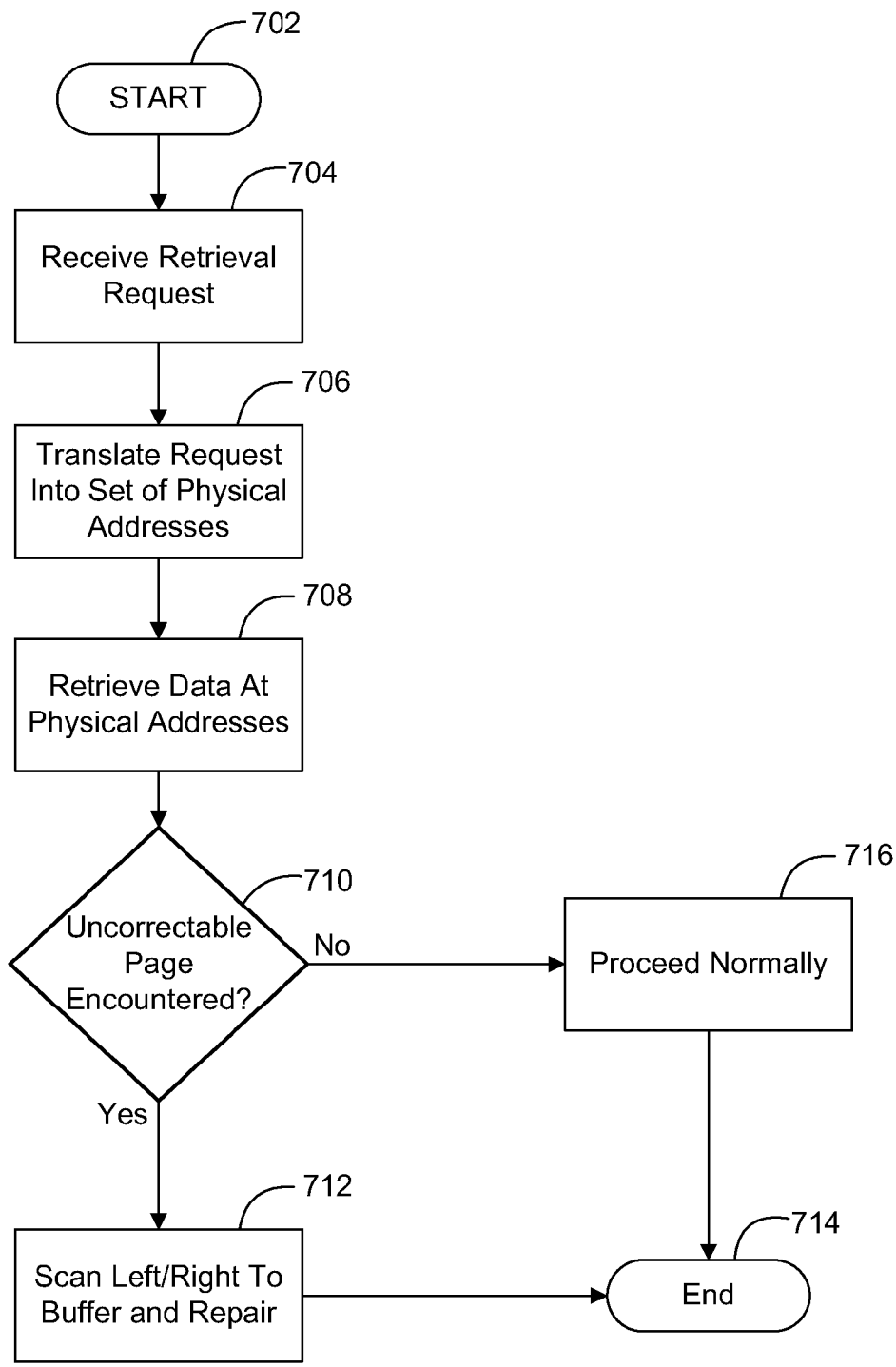
FIGS. 7A, 7B, and 8 show processes for retrieving data from a non-volatile memory in accordance with some embodiments of the invention.
Figure 7B:
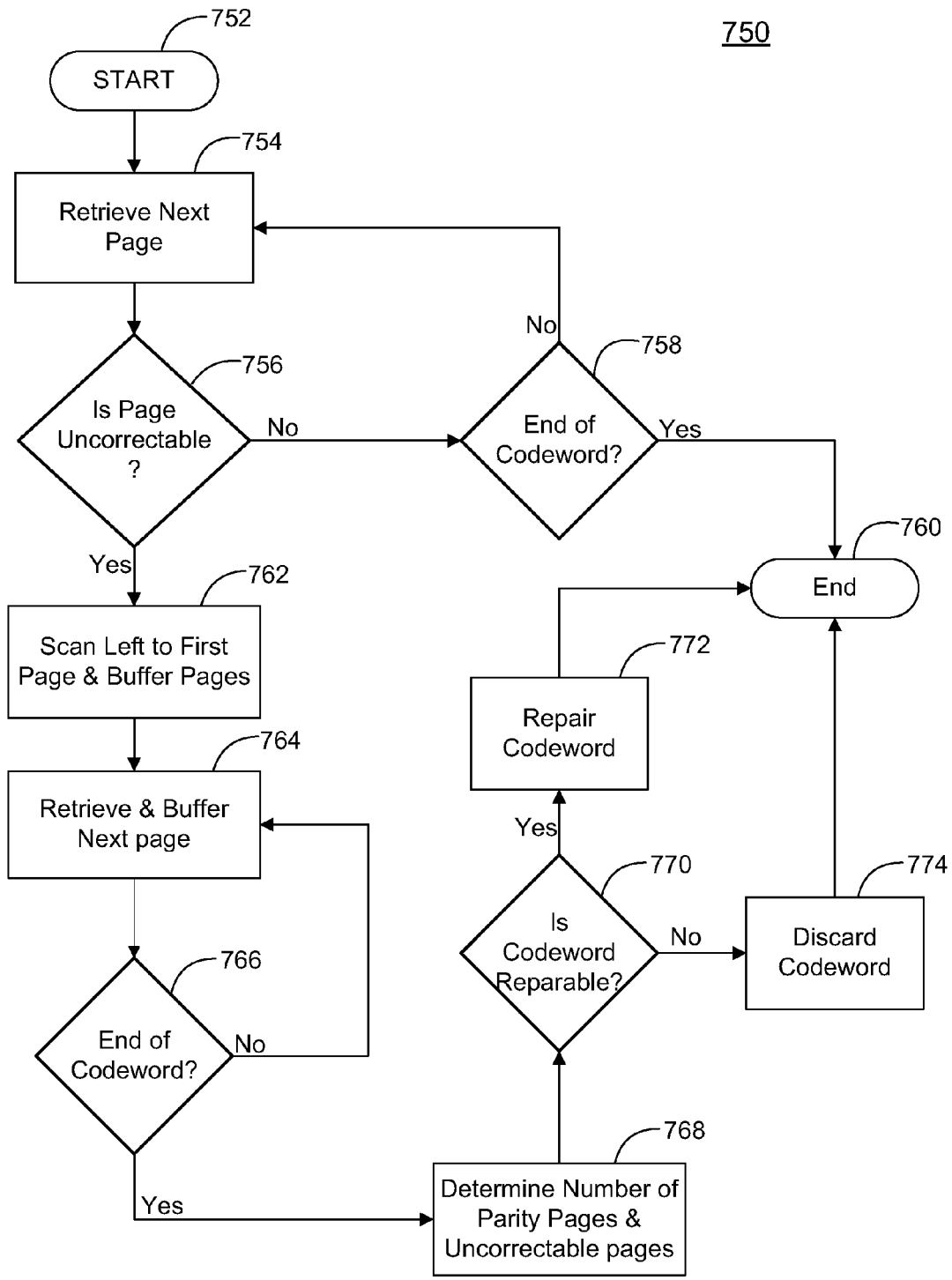
Figure 8:
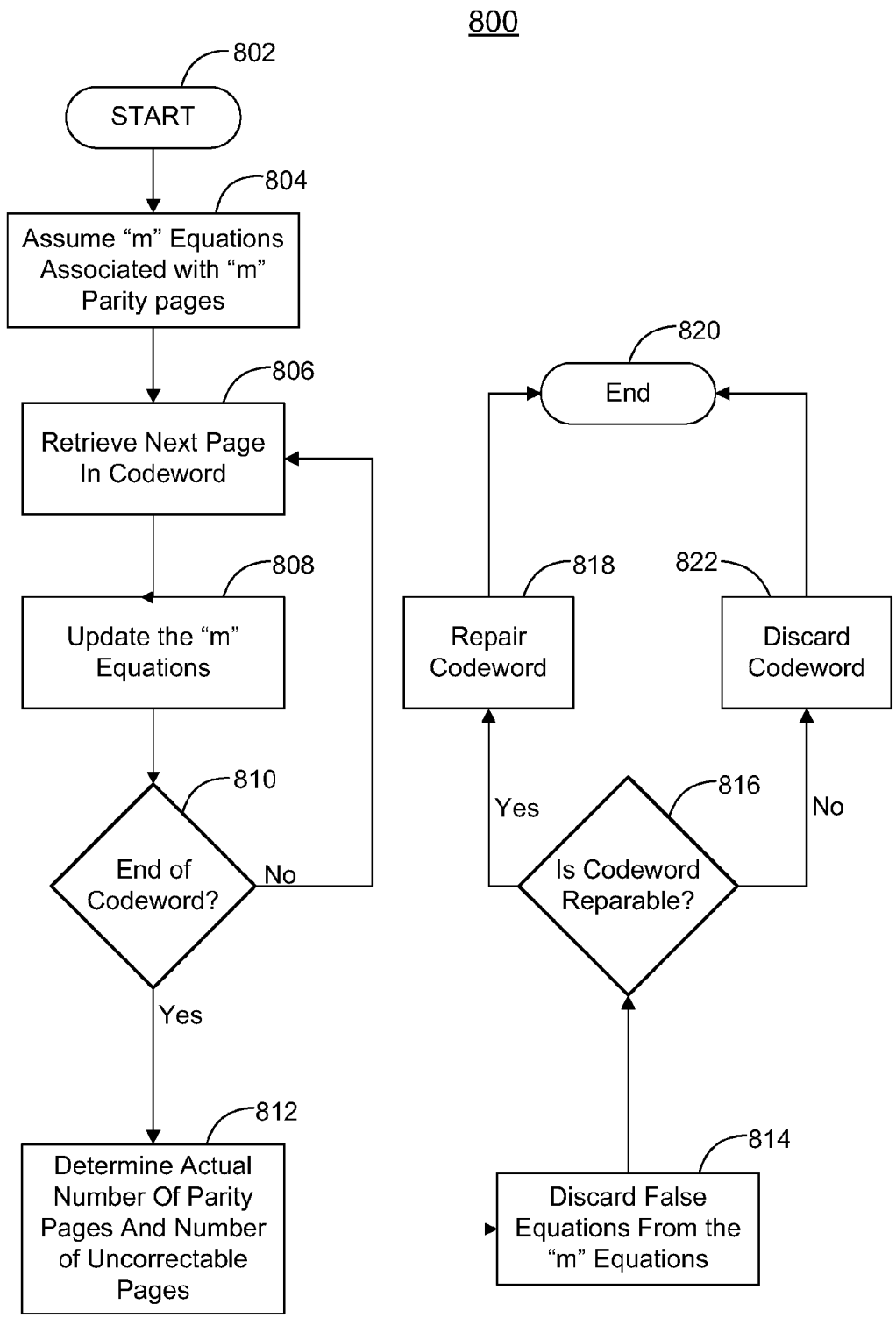

FIGS. 7A, 7B, and 8 shows processes 700, 750, and 800, respectively, for retrieving data from a codeword of a non-volatile memory. Any suitable memory interface, such as NVM interface 118 or 218 of FIGS. 1 and 2, respectively can execute processes 700, 750, and 800, and these processes may sometimes be described as such. However, it should be understood that any other suitable component(s) in a memory system or electronic device may be configured to perform these steps.

Processes 700 and 750 may, for example, buffer the data of the pages of a codeword as that data is retrieved. The buffered data may then be used for repairing uncorrectable pages of the codeword.

Process 700 can begin at step 702. At step 704, a request to retrieve a particular set of data from the NVM can be received. For example, a request to read the data, process the data, or otherwise access the data can be received. At step 706, the request can be translated into an associated set of physical addresses. For example the physical addresses of the pages in which the particular set of data is stored can be determined.

At step 708, the data stored at the physical addresses of step 706 can be retrieved. As the data is being retrieved, process 700 can determine whether an uncorrectable page has been encountered at step 710. In response to no uncorrectable pages being encountered, the retrieve of the data of the physical address can proceed "normally." In other words, the data can be retrieved without executing additional steps related to outer ECC data or related to repairing an uncorrectable page.

In response to an uncorrectable page being encountered, however, process 700 can proceed to step 716. At step 716, the data requested for retrieval can be buffered. For example, starting from the uncorrectable page, the NVM can scan left and scan right to buffer the data stored in the physical addresses that was determined at step 706. This buffered data may then be used to repair the uncorrectable page or pages. For example, the buffered data can be used in conjunction with one or more outer ECC codes associated with the buffered data to repair the uncorrectable pages. Process 700 can then end at step 714.

Proceeding to FIG. 7B, process 750 may, for example, buffer the data of the pages of a codeword as that data is retrieves. Some of the steps of process 750 may correspond to one or more steps of process 700 of FIG. 7A. For example, the steps of process 750 may illustrate steps 708, 710, 712, and 714 of process 700 in greater detail.

Process 750 can begin at step 752. At step 754, the first page (e.g., physical address) of the codeword can be retrieved. For example, the "codeword" can correspond to the set of physical addresses determined at step 706 of process 700. To retrieve the data of a page, the page can be read, processed, or otherwise have its stored data accessed. At step 756, process 750 can determine whether the page retrieved at step 754 is uncorrectable. For example, the page may be uncorrectable if it has more than t errors, such that any inner ECC data of the page is unable to correct that page's errors. In response to the page not being uncorrectable, process 750 can determine whether the end of the codeword has been reached at step 758. If the end of the codeword has not been reached, process 750 can return to step 754 and the next page (e.g., physical address) can be retrieved. Alternatively, if the end of the codeword has been reached, process 750 can end at step 760. In this manner, when no pages of the codeword are uncorrectable, the entire codeword can be retrieved (i.e., by looping through steps 754, 756, and 756) and process 750 can end without having any of the pages buffered.

Returning to step 756, in response to a page of the codeword being uncorrectable, the NVM interface can "scan left" at step 762 to the beginning of the codeword. For example, the NVM interface can identify the beginning of a codeword by scanning left until a page is reached whose parity page marker (e.g., metadata tag) indicates it is a parity page. In this case, the page directly proceeding the parity page can be determined as the beginning of the codeword. As another example, the NVM interface can scan left until a first page metadata tag is encountered, thus indicating that this page is the first page of the codeword. The NVM interface may buffer these pages that are to the left of the page retrieved at step 754 as well as the page retrieved at step 754 itself. Process 750 may then continue retrieving and buffering the remaining pages of the codeword at steps 764 and 766.

In response to the end of the codeword being reached and the entire codeword being buffered, the number of parity pages and uncorrectable pages can be determined at step 768. For example, the NVM interface may have kept a tally of the number of uncorrectable pages as the pages were retrieved. To determine the number of parity pages, the NVM interface can "scan right" across the parity pages until a page is reached whose parity page marker indicates it is not a parity page (e.g., thus indicating all parity pages of the codeword have been scanned).

There may be instances in which pages may not be reparable through the use of one or more parity pages. In these instances, the NVM controller may invoke any one of a number of uncorrectable error handling policies. For example, if a user data page is uncorrectable, the NVM controller may recover the page by accessing a data structure in volatile memory to obtain metadata for that page. Recovery from the uncorrectable error enables the system to continue operating and maintain data coherency. Additional details for recovering from an uncorrectable error can be found, for example, in Post et al., U.S. patent application Ser. No. 12/729,554, filed Mar. 23, 2010, entitled "Uncorrectable Error Handling Schemes for Non-Volatile Memories," the disclosure of which is hereby incorporated by reference in its entirety. As another example, if an index page (i.e., a page in NVM that stores mappings of logical sectors to physical addresses) is uncorrectable, the NVM may attempt to reconstruct that page by accessing a data structure in volatile memory before invoking a restore operation. Additional details for handling an index page having an uncorrectable error can be found, for example, in Wakrat et al., U.S. patent application Ser. No. 12/509,071, filed Jul. 24, 2009, and Post et al., U.S. patent application Ser. No. 12/729,556, filed Mar. 23, 2010. entitled "Garbage Collection Schemes for Index Block," both disclosures of which are incorporated by reference in their entireties.

At step 770, process 750 can determine whether the codeword is reparable. For example, when the number of parity pages is equal to or greater than the number of uncorrectable pages, then the codeword may be reparable. As another example, when the number of parity pages is less than the number of uncorrectable pages, then the codeword may not be reparable. In response to the codeword being reparable, the codeword can be repaired at step 772. For example, equations such as equation (1) (e.g., when the codeword has one set of outer ECC data) or equations (3) and (4) (e.g., when the codeword has two sets of outer ECC data) or any other suitable equation(s) can be calculated to repair the uncorrectable pages. Process 750 can then end at step 760. When the codeword is not reparable, however, the codeword may, for example, be discarded at step 774 as having inaccurate data.

In some embodiments, process 750 can alternatively start at step 764 and the previous steps can be omitted. For example, doing so can provide for a system that always buffers the data of a codeword without first determining whether at least one uncorrectable page is present.

FIG. 8 shows process 800 for retrieving data from a codeword of a non-volatile memory. For example, as the data is retrieved, process 800 can calculate equations "on the fly" for repairing uncorrectable pages of the codeword. In other words, process 800 can repair uncorrectable pages without needing to buffer the data of those pages. Although not shown for simplicity, process 800 can additionally include pre-steps such as steps 704 and 706 of process 700, in which a retrieval request for a codeword is received, and this retrieval request is translated into a set of physical addresses.

Process 800 can begin at step 802. At step 804, the process can assume the codeword will have "m" parity pages (e.g., "m" sets of outer ECC data) and that there will be "m" equations associated with those parity pages (e.g., where "m" can be 1, 2, 3, 4, or any other suitable number). For example, when m is equal to 1, process 800 may assume equation (1). As another example, when m is equal to 2, process 800 may assume equations (3) and (4).

At step 806, the first page in the codeword can be retrieved. For example, the page can be read, processed, or otherwise has its stored data accessed. At step 808, the calculation of the equation or equations determined at step 804 can be updated with the data of the retrieved page. At step 810, process 800 can determine whether the end of the codeword has been reached. In response to the end not being reached, process 800 can return to step 806 and can repeat steps 808 and 810. In this manner, by looping through steps 806, 808, and 810 until of the codeword is reached, the equations of step 804 can be calculated "on the fly" by continually progressing through the codeword, retrieving the pages, and updating the calculations with the data of the retrieved pages.

In response to the end of the codeword being reached, process 800 can determine the actual number of parity pages associated with the codeword at step 812. For example, upon reaching the parity pages of the codeword, the NVM interface can determine the number of parity pages by "scanning right" across the parity pages until a page is reached whose parity page marker indicates it is not a parity page (e.g., thus indicating all parity pages of that codeword have been scanned). The actual number of parity pages determined at step 812 may or may not be equal to the "m" number of parity pages assumed at step 804. At step 812, the NVM interface can also determine the number of uncorrectable pages in the codeword. For example, as the codeword is retrieved, the NVM interface may have kept a tally of the number of pages with greater than t errors.

At step 814, the "false" equations (if any) can be discarded from the "m" equations. The false equations can include any equations calculated in process 800 that were assumed to exist, but for which there was no suitable outer ECC data to create that equation. As an illustration, at step 804 the NVM interface may have assumed there were 2 parity pages and thus calculated equations (3) and (4) on the fly as the codeword was retrieved. However, at step 812, the NVM interface may have determined there was only one actual parity page associated with the codeword. Accordingly, at step 814, equation (4) can be discarded as a false equation.

At step 816, process 800 can determine whether the codeword is reparable. For example, if the number of equations not discarded at step 814 (e.g., or the number of actual parity pages determined at step 812) is equal to or greater than the number of uncorrectable pages, then the codeword can be reparable. In response to the codeword being reparable, the codeword can then be repaired at step 818 and the process can end at step 820. For example, one or more of the "m" equations not discarded at step 814 can be used to solve for the correct values of the uncorrectable pages. When the codeword is not reparable, however, the codeword may, for example, be discarded at step 822 as having inaccurate data.

It should be understood that the processes described above are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method of storing user data in a non-volatile memory ("NVM"), wherein the NVM comprises a plurality of pages, the method comprising:
    selecting an encoding technique to employ on the user data, wherein the size of the user data is larger than the size of one of the plurality of pages;
    applying the encoding technique to the user data to generate at least one page worth of parity data;
    programming the user data in a first portion of the plurality of pages;
    storing the parity data in a second portion of the plurality of pages, wherein the storing comprises marking a metadata field in each page of the second portion to indicate the second portion stores the parity data; and
    based on the metadata field, not including the second portion of the plurality of pages in a mapping address table of the NVM.

2. The method of claim 1, wherein the second portion comprises at least two pages.

3. The method of claim 1, further comprising:
    redundantly storing the metadata field indicating the second portion stores the parity data in a second memory location of the NVM.

4. The method of claim 1, wherein the second portion comprises a non-regular distribution across the NVM.

5. The method of claim 1, further comprising:
    determining the first portion comprises at least one uncorrectable page; and using the parity data to repair the at least one uncorrectable page.

6. The method of claim 1, wherein the non-volatile memory comprises flash memory.

7. A method for building a logical-to-physical mapping address table of a non-volatile memory ("NVM"), wherein the NVM comprises a plurality of pages and wherein each page is associated with a unique physical address, the method comprising:
processing a first page of the plurality of pages by:
reading a first metadata tag of the first page, wherein the first metadata tag indicates whether or not the first page is a parity page;
in response to determining the first metadata tag indicates the first page is not a parity page:
determining a first logical address of the first page;
storing the first logical address with the first page's unique physical address in the logical-to-physical mapping address table; and
in response to determining the first metadata tag indicates the first page is a parity page, skipping the first page such that the first logical address is not stored in the address table.

8. The method of claim 7, further comprising:
determining the NVM has powered on; and
wherein the reading of the first metadata tag occurs in response to determining the NVM has powered on.

9. The method of claim 7, further comprising:
sequentially processing each page of the plurality of pages by proceeding to a next page of the plurality of pages and performing the processing on the next page until a final page of the plurality has been processed.

10. The method of claim 7, wherein determining a first logical address comprises:
reading the first logical address from metadata of the first page.

11. An electronic device comprising:
a non-volatile memory ("NVM") comprising a plurality of pages wherein:
a subset of the plurality of pages are parity pages; and
the plurality of pages are grouped into a plurality of codewords, each codeword of the plurality of codewords comprising at least two contiguous pages of the plurality of pages and comprising at least one parity page, and wherein each codeword of at least a first subset of the plurality of codewords comprise at least two parity pages; and
a processor for controlling access to the plurality of pages of the NVM, wherein the processor is configured to:
mark a metadata field in each parity page to indicate the page is a parity page; and
based on the metadata field, not include any parity page in a mapping address table of the NVM.

12. The electronic device of claim 11, further comprising:
an error correcting code module configured to:
apply an encoding technique to user data of a particular codeword of the plurality of codewords to generate parity data associated with the particular codeword; and
wherein the processor is further configured to:
store the parity data in at least one parity page of the particular codeword.

13. The electronic device of claim 11, wherein the processor is further configured to:
retrieve each page of a particular codeword;
identify, during the retrieving, an uncorrectable page of the particular codeword;
scan left, in response to the encountering, to buffer data of each page in the particular codeword previous to the uncorrectable page;
scan right, in response to the encountering, to determine an end of the particular codeword; and
buffer data of the uncorrectable page and data of each page in the codeword after the uncorrectable page as each page after the uncorrectable page is retrieved.

14. The electronic device of claim 13, wherein the processor is further configured to:
determine a beginning of the particular codeword by scanning left until a parity page marker is encountered.

15. The electronic device of claim 13, wherein the processor is further configured to:
determine a beginning of the particular codeword by scanning left until a first page metadata tag is encountered.

16. The electronic device of claim 13, wherein the processor is further configured to:
determine the end of the particular codeword by scanning right until a non-parity page marker following a parity page marker is encountered.

17. The electronic device of claim 13, wherein the processor is further configured to:
determine the end of the particular codeword by scanning right until a first page metadata tag is encountered.

18. The electronic device of claim 13, wherein the processor is further configured to:
repair the uncorrectable page based on the buffered data and at least one parity page comprised in the particular codeword.

19. The electronic device of claim 11, wherein the processor is further configured to:
generate at least two parity equations based on a preliminary assumption that a particular codeword comprises a first number of assumed parity pages;
retrieve the particular codeword; and
update calculations of the at least two parity equations with data of each page of the particular codeword as each page is retrieved.

20. The electronic device of claim 19, wherein the processor is further configured to:
determine, upon retrieving the end of the particular codeword, a second number of actual parity pages associated with the particular codeword by reading a metadata tag of each actual parity page;
determine the second number is less than the first number; and
discard all but a second number of the updated calculations of the at least two parity equations.

21. The electronic device of claim 19, wherein the processor is further configured to:
determine, upon retrieving the end of the particular codeword, a second number of actual parity pages associated with the particular codeword by reading a metadata tag of each actual parity page;
determine the second number is equal to the first number; and
use the updated calculations of the at least two parity equations to repair at least one uncorrectable page of the particular codeword.

22. The electronic device of claim 11, further comprising:
an integrated circuit package, wherein the NVM and the processor are included in the integrated circuit package.

23. The electronic device of claim 11, further comprising:
an integrated circuit package, wherein the NVM is included in the integrated circuit package, and wherein the processor is implemented in a system-on-a-chip external to the integrated circuit package.

24. The electronic device of claim 11, wherein the non-volatile memory comprises flash memory.

25. An electronic device comprising:
a non-volatile memory ("NVM") comprising a plurality of pages wherein:
  a subset of the plurality of pages are parity pages; and
  the plurality of pages are grouped into a plurality of codewords, each codeword of the plurality of codewords comprising at least two contiguous pages of the plurality of pages and comprising at least one parity page, and wherein each codeword of at least a first subset of the plurality of codewords comprise at least two parity pages; and
a processor for controlling access to the plurality of pages of the NVM, wherein the processor is configured to:
  mark a metadata field in each parity page to indicate the page is a parity page;
  generate at least two parity equations based on a preliminary assumption that a particular codeword comprises a first number of assumed parity pages;
  retrieve the particular codeword; and
  update calculations of the at least two parity equations with data of each page of the particular codeword as each page is retrieved.

26. The electronic device of claim 25, wherein the processor is further configured to:
  determine, upon retrieving the end of the particular codeword, a second number of actual parity pages associated with the particular codeword by reading a metadata tag of each actual parity page;
  determine the second number is less than the first number; and
  discard all but a second number of the updated calculations of the at least two parity equations.

27. The electronic device of claim 25, wherein the processor is further configured to:
  determine, upon retrieving the end of the particular codeword, a second number of actual parity pages associated with the particular codeword by reading a metadata tag of each actual parity page;
  determine the second number is equal to the first number; and
  use the updated calculations of the at least two parity equations to repair at least one uncorrectable page of the particular codeword.

* * * * *

UNITED STATES PATENT AND TRADEMARK OFFICE
CERTIFICATE OF CORRECTION

PATENT NO.         : 8,726,126 B2                                      Page 1 of 1
APPLICATION NO.    : 12/729564
DATED              : May 13, 2014
INVENTOR(S)        : Daniel J. Post It is certified that error appears in the above-identified patent and that said Letters Patent is hereby corrected as shown below:

In the Specification

In Column 8, Line 55, delete "if the are n errors" and insert -- if there are "n" errors --, therefor.

Signed and Sealed this
Nineteenth Day of January, 2016

Michelle K. Lee
*Director of the United States Patent and Trademark Office*